(12) United States Patent
Shigihara

(10) Patent No.: US 10,274,873 B2
(45) Date of Patent: Apr. 30, 2019

(54) BELT UNIT

(71) Applicant: CANON KABUSHIKI KAISHA, Tokyo (JP)

(72) Inventor: Keita Shigihara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/907,116

(22) Filed: Feb. 27, 2018

(65) Prior Publication Data

US 2018/0253038 A1    Sep. 6, 2018

(30) Foreign Application Priority Data

Mar. 1, 2017 (JP) ................. 2017-038095

(51) Int. Cl.

| | |
|---|---|
| *B65G 45/10* | (2006.01) |
| *G03G 15/16* | (2006.01) |
| *G03G 15/00* | (2006.01) |
| *B65G 39/20* | (2006.01) |
| *B65G 15/30* | (2006.01) |
| *G03G 21/00* | (2006.01) |
| *B65G 45/12* | (2006.01) |

(52) U.S. Cl.
CPC ......... *G03G 15/1615* (2013.01); *B65G 39/20* (2013.01); *G03G 15/168* (2013.01); *G03G 15/6529* (2013.01); *B65G 15/30* (2013.01); *B65G 45/12* (2013.01); *G03G 21/0035* (2013.01); *G03G 2215/1623* (2013.01)

(58) Field of Classification Search
CPC ........ B65G 45/18; B65G 45/12; B65G 15/64; G03G 15/1605; G03G 15/00; G03G 15/16; G03G 15/20; G03G 21/00; G03G 21/16; B65H 5/02; B65H 5/025
USPC ............................ 198/806, 810.02, 494, 496
See application file for complete search history.

(56) References Cited

U.S. PATENT DOCUMENTS

| | | | | |
|---|---|---|---|---|
| 4,377,229 | A | * 3/1983 | Miyashita | .......... G03G 15/6529 15/1.51 |
| 5,412,461 | A | * 5/1995 | Thayer | .................. B65G 45/16 198/494 |

(Continued)

FOREIGN PATENT DOCUMENTS

| | | | | |
|---|---|---|---|---|
| JP | 4-101915 | * | 4/1992 | ............ B65G 33/08 |
| JP | 2002-132057 A | | 5/2002 | |

(Continued)

*Primary Examiner* — James R Bidwell
(74) *Attorney, Agent, or Firm* — Canon U.S.A., Inc. IP Division

(57) ABSTRACT

First and second abutment portions are disposed in a cleaning container. The first abutment portion is arranged on the outer side relative to a first cleaning member in a width direction of a belt at a position corresponding to the first cleaning member in a circumferential direction of the belt and abuts against the outer peripheral surface of the belt. The second abutment portion is arranged on the outer side relative to a second cleaning member in the width direction at a position corresponding to the second cleaning member in the circumferential direction and abuts against the outer peripheral surface of the belt. The outer end of the first abutment portion is located on the inner side relative to the end of the first roller, and the inner end of the second abutment portion is located on the outer side relative to the end of the second roller.

17 Claims, 15 Drawing Sheets

(56) References Cited

U.S. PATENT DOCUMENTS

| | | | | |
|---|---|---|---|---|
| 5,519,480 | A  * | 5/1996 | Thayer | G03G 15/754 |
| | | | | 198/496 |
| 9,840,387 | B2 * | 12/2017 | Shigihara | B65H 5/025 |
| 2011/0182615 | A1 * | 7/2011 | Morishita | G03G 21/1842 |
| | | | | 399/111 |
| 2012/0199443 | A1 * | 8/2012 | Kaneyama | G03G 15/161 |
| | | | | 198/496 |
| 2012/0237260 | A1 * | 9/2012 | Sengoku | G03G 15/161 |
| | | | | 399/162 |
| 2014/0144759 | A1 * | 5/2014 | Kawanami | G03G 15/0189 |
| | | | | 198/813 |
| 2014/0183007 | A1 * | 7/2014 | Hozumi | G03G 15/1615 |
| | | | | 198/806 |

FOREIGN PATENT DOCUMENTS

| | | |
|---|---|---|
| JP | 2007-079399 A | 3/2007 |
| JP | 2015-200744 A | 11/2015 |
| JP | 2016-206420 A | 12/2016 |

* cited by examiner

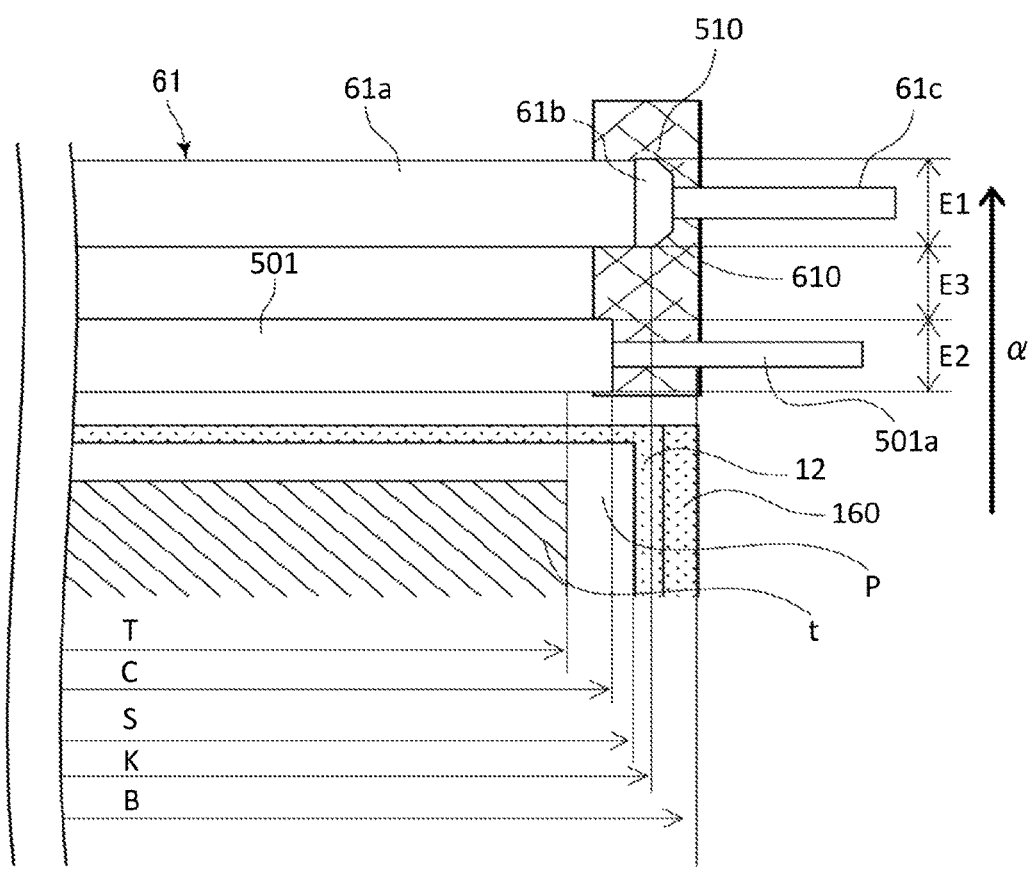

BELT UNIT

BACKGROUND OF THE INVENTION

Field of the Invention

The present disclosure relates to a belt unit that includes an endless belt.

Description of the Related Art

A belt unit rotates an endless belt by supporting the endless belt in a tensioned state by a plurality of rollers. In this case, a deviation of the belt in the width direction occurs due to a misalignment and a resistance in each of the roller. Thus, there has been conventionally known a configuration that restricts a deviation of a belt by abutment between the end of a roller and a rib which is disposed as a restriction member on the inner peripheral surface of the end of the belt (e.g., Japanese Patent Laid-Open No. 2002-132057).

Further, there has been proposed a configuration including a scattering prevention member, such as fur, as an abutment member which abuts against the outer peripheral surface of the width-direction end of a belt so as to prevent toner from scattering to the outside in a belt unit used in an image forming apparatus (Japanese Patent Laid-Open No. 2015-200744).

When the scattering prevention member abuts against the outer peripheral surface of the belt which overlaps the end of a first roller which restricts the deviation of the belt, the rib may climb on the end of the first roller due to pressing by the scattering prevention member. Thus, it is considered that the scattering prevention member is configured to abut against the belt on the inner side in the width direction relative to the end of the first roller.

However, in the configuration that restricts the deviation of the belt by the rib, it is required that a second roller other than the first roller have an axial-direction length shorter than that of the first roller in order to prevent the interference with the rib. In such a configuration, when the scattering prevention member abuts against the belt on the inner side in the width direction relative to the end of the first roller, the position where the scattering prevention member abuts against the belt may extend across the end of the second roller. In this case, a stress produced by bending of the belt on the end of the second roller caused by pressing by the scattering prevention member increases, which may disadvantageously reduce the life of the belt.

SUMMARY OF THE INVENTION

It is an aspect of the present disclosure to provide a configuration capable of preventing climbing of a restriction member and a reduction in a belt life.

The present disclosure provides a belt unit including: an endless belt configured to rotate and configured to carry a toner image on an outer peripheral surface thereof; a first roller configured to abut against an inner peripheral surface of the belt, a second roller configured to abut against the inner peripheral surface of the belt; a restriction member disposed on the inner peripheral surface of an end of the belt and configured to abut against an axial-direction end of the first roller to restrict a movement in a width direction intersecting a rotation direction of the belt; and an abutment member configured to abut against an outer peripheral surface of the belt on the outer side in the width direction relative to a carrying region capable of carrying a toner image. The second roller has an axial-direction length shorter than an axial-direction length of the first roller. The abutment member is configured in such a manner that an abutment region that abuts against the outer peripheral surface of the belt is located on the inner side in the width direction relative to a region of the axial-direction end of the first roller that is abuttable against the restriction member in a first region where the first roll is located in the rotation direction of the belt and is located on the outer side in the width direction relative to the axial-direction end of the second roller in a second region where the second roller is located in the rotation direction of the belt.

Further features of the present disclosure will become apparent from the following description of exemplary embodiments (with reference to the attached drawings).

BRIEF DESCRIPTION OF THE DRAWINGS

FIG. 4 is a schematic diagram illustrating the relationship between the arrangement of each roller and an arrangeable range of a brush.

DESCRIPTION OF THE EMBODIMENTS

First Embodiment

Figure 1:
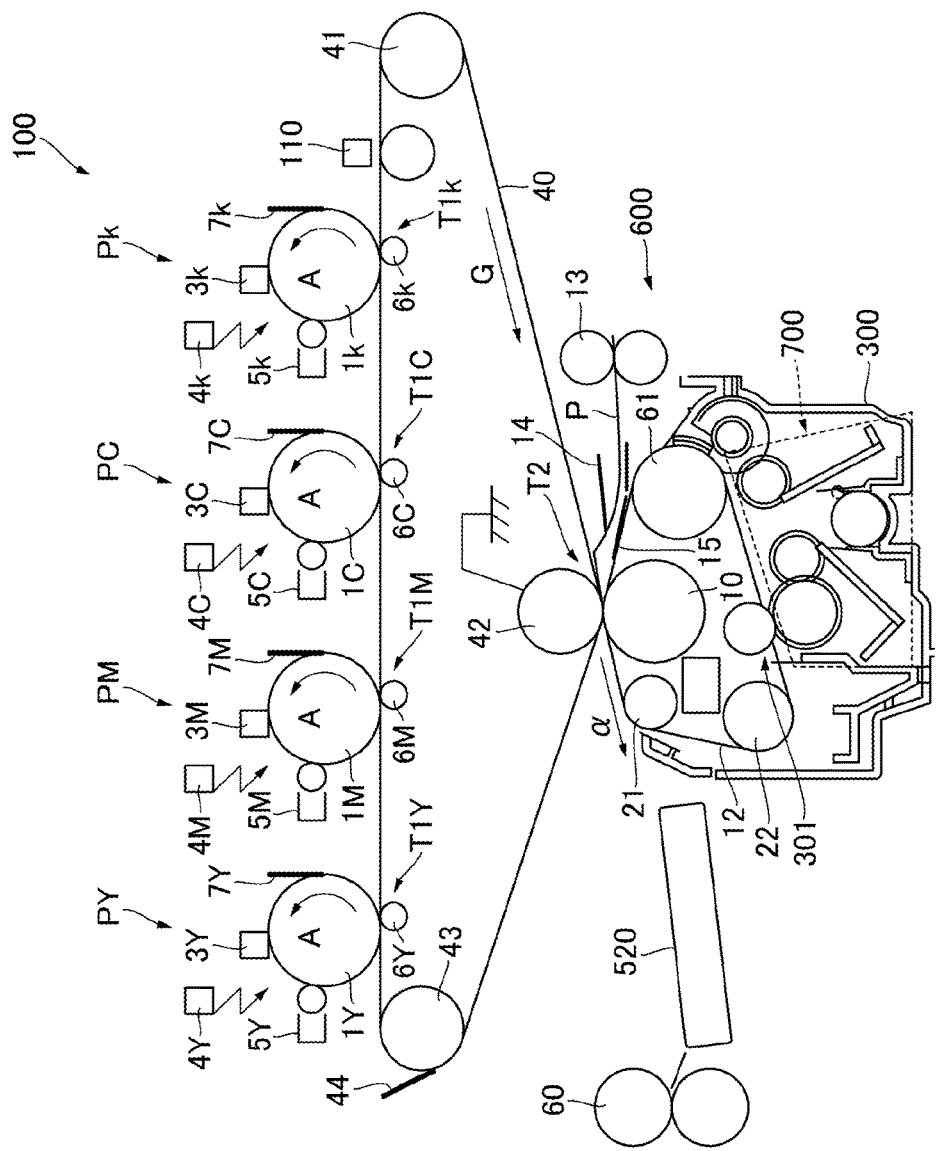
FIG. 1 is a schematic configuration sectional view of an image forming apparatus according to a first embodiment.

A first embodiment will be described with reference to FIGS. 1 to 11. First, a schematic configuration of an image forming apparatus of the present embodiment will be described with reference to FIG. 1.

[Image Forming Apparatus]

An image forming apparatus 100 is an electrophotographic type full-color printer which includes four image forming units PY, PM, PC, Pk which respectively correspond to four colors of yellow, magenta, cyan, and black. In the present embodiment, the image forming apparatus 100 is a tandem type image forming apparatus in which the image forming units PY, PM, PC, Pk are arranged in a rotation direction of an intermediate transfer belt 40 (described below). The image forming apparatus 100 forms a toner image (image) on a recording medium P according to an image signal from a document reading apparatus (not illustrated) which is connected to a main body of the image forming apparatus 100 or a host device such as a personal computer which is communicably connected to the main body of the image forming apparatus 100. Examples of the recording medium include sheet materials such as paper, a plastic film, and a cloth.

An outline of such an image forming process will be described. First, in each of the image forming units PY, PM, PC, Pk, a toner image of the corresponding color is formed on each of photosensitive drums 1Y, 1M, 1C, 1k. The toner image of each color formed in this manner is transferred onto the intermediate transfer belt 40 and then transferred onto the recording medium P from the intermediate transfer belt 40. The recording medium P with the transferred toner image is conveyed to a fixing device 60 so that the toner image is fixed to the recording medium P. Hereinbelow, detailed description will be made.

The four image forming units PY, PM, PC, Pk of the image forming apparatus 100 have substantially the same configuration except for developing colors. Thus, hereinbelow, the image forming unit PY will be representatively described, and description for the other image forming units will be omitted.

A cylindrical photoreceptor, that is, the photosensitive drum 1Y is disposed as an image carrier on the image forming unit PY. The photosensitive drum 1Y is driven to rotate in a direction indicated by an arrow A in the drawing. A charging device 3Y, a developing device 5Y, a primary transfer roller 6Y, and a cleaning device 7Y are arranged around the photosensitive drum 1Y. An exposure device 4Y is arranged above the photosensitive drum 1Y in the drawing.

Further, the intermediate transfer belt 40 is arranged facing the photosensitive drums 1Y, 14, 1C, 1k. The intermediate transfer belt 40 is supported in a tensioned state by a drive roller 43, a secondary transfer counter roller 42, and a tension roller 41. The intermediate transfer belt 40 circles (rotates) in a direction indicated by an arrow G in the drawing at 400 to 500 mm/sec by driving the drive roller 43. The intermediate transfer belt 40 is formed of, for example, a resin such as polyimide or polycarbonate or various rubber that contains an appropriate amount of carbon black as an antistatic additive. The volume resistivity of the transfer belt 40 is 1E+9 to 1E+14 Ω·cm. The thickness of the intermediate transfer belt 40 is 0.07 to 0.1 mm.

A secondary transfer roller 10 is arranged at a position that faces the secondary transfer counter roller 42 with the intermediate transfer belt 40 and a secondary transfer belt 12 of a secondary transfer device 600 interposed therebetween to constitute a secondary transfer unit T2 which transfers a toner image on the intermediate transfer belt 40 to the recording medium P. The fixing device 60 is arranged on the downstream side in the conveyance direction of the recording medium relative to the secondary transfer unit T2.

A process of forming an image by the image forming apparatus 100 configured in the above manner will be described. First, when an image forming operation is started, the surface of the photosensitive drum 1Y, which is rotating, is uniformly charged by the charging device 3Y. Then, the photosensitive drum 1Y is exposed with laser light corresponding to an image signal emitted from the exposure device 4Y. Accordingly, an electrostatic latent image corresponding to the image signal is formed on the photosensitive drum 1Y. The electrostatic latent image on the photosensitive drum 1Y is visualized by toner which is stored inside the developing device 5Y so as to become a visible image. The present embodiment uses a reversal development system which develops an electrostatic latent image by adhering toner to an exposed part of the electrostatic latent image.

The electrostatic latent image formed by the exposure device 4Y is an aggregate of small dot images. The density of a toner image to be formed on the photosensitive drum 1Y can be changed by changing the density of the dot images. In the present embodiment, the maximum density of a toner image of each color is approximately 1.5 to 1.7. An applied amount of toner at the maximum density is approximately 0.4 to 0.6 mg/cm$^2$.

The toner image formed on the photosensitive drum 1Y is primarily transferred to the intermediate transfer belt 40 in a primary transfer unit T1Y which includes the photosensitive drum 1Y and the primary transfer roller 6Y which is arranged across the intermediate transfer belt 40. Toner (transfer residual toner) remaining on the surface of the photosensitive drum 1Y after the primary transfer is removed by the cleaning device 7Y.

Such an operation is performed also in the magenta, cyan, and black image forming units in sequence, and four colors of toner images are superimposed on the intermediate transfer belt 40. The toner image formed on the intermediate transfer belt 40 is sent to the secondary transfer unit T2. On the other hand, recording media P stored in a recoding medium storage cassette (not illustrated) are fed toward a registration roller 13 one by one. The recording medium P fed to the registration roller 13 is temporarily stopped in the registration roller 13. The registration roller 13 feeds the recording medium P to the secondary transfer unit T2 in synchronization with conveyance of the toner image on the intermediate transfer belt 40 to the secondary transfer unit T2.

The behavior of the recording medium P coming close to the surface of the intermediate transfer belt 40 on the upstream side of the secondary transfer unit T2 is restricted by an upper guide 14. Further, the behavior of the recording medium P separating from the surface of the intermediate transfer belt 40 is restricted by a lower guide 15. These guides form a conveyance path for conveying the recording medium P from the registration roller 13 to the secondary transfer unit T2.

When the recording medium P passes through the secondary transfer unit T2, a secondary transfer bias having an opposite polarity to the toner is applied to the secondary transfer roller 10. Here, the toner images on the intermediate transfer belt 40 are collectively secondarily transferred to the recording medium P fed to the secondary transfer unit T2, and the recording medium P is adhered to the secondary transfer belt 12 by an electrostatic force produced by the feeding. In the present embodiment, an electric current of, for example, +40 to 60 µA is applied to the secondary transfer unit T2 by the application of the secondary transfer bias. Toner remaining on the intermediate transfer belt 40 without being transferred at the secondary transfer unit T2 is removed by an intermediate transfer belt cleaner 44.

The secondary transfer belt 12 moves in a direction indicated by an arrow α to convey the recording medium P adhered to the surface of the secondary transfer belt 12 downstream. Upon arriving at a separation roller which supports the secondary transfer belt 12 in a tensioned state, the recording medium P on the secondary transfer belt 12 is separated from the surface of the secondary transfer belt 12 due to the curvature of the separation roller 21 and conveyed to a pre-fixing conveyance device 520 which is located on the downstream side. The recording medium P is conveyed to the fixing device 60 by the pre-fixing conveyance device 520. An unfixed toner image on the recording medium P is fixed to the recording medium P by the fixing device 60. Then, the recording medium P is discharged to the outside of the apparatus.

A toner density sensor 110 is arranged at a position that faces the surface of the intermediate transfer belt 40 on the downstream side of the image forming unit Pk. The toner density sensor 110 includes, for example, a light emitting unit which emits light toward the intermediate transfer belt 40 and a light receiving unit which receives light reflected by the intermediate transfer belt 40. The toner density sensor 110 is capable of detecting a toner density of a toner image formed on the intermediate transfer belt 40 on the basis of the light detected by the light receiving unit. The image forming apparatus 100 forms a toner image for control on the intermediate transfer belt 40 at an appropriate timing and detects a toner density of the toner image for control using the toner density sensor 110. Then, a control unit (not illustrated) of the image forming apparatus 100 changes various image forming conditions on the basis of the detected toner density.

[Secondary Transfer Device]

Figure 2:
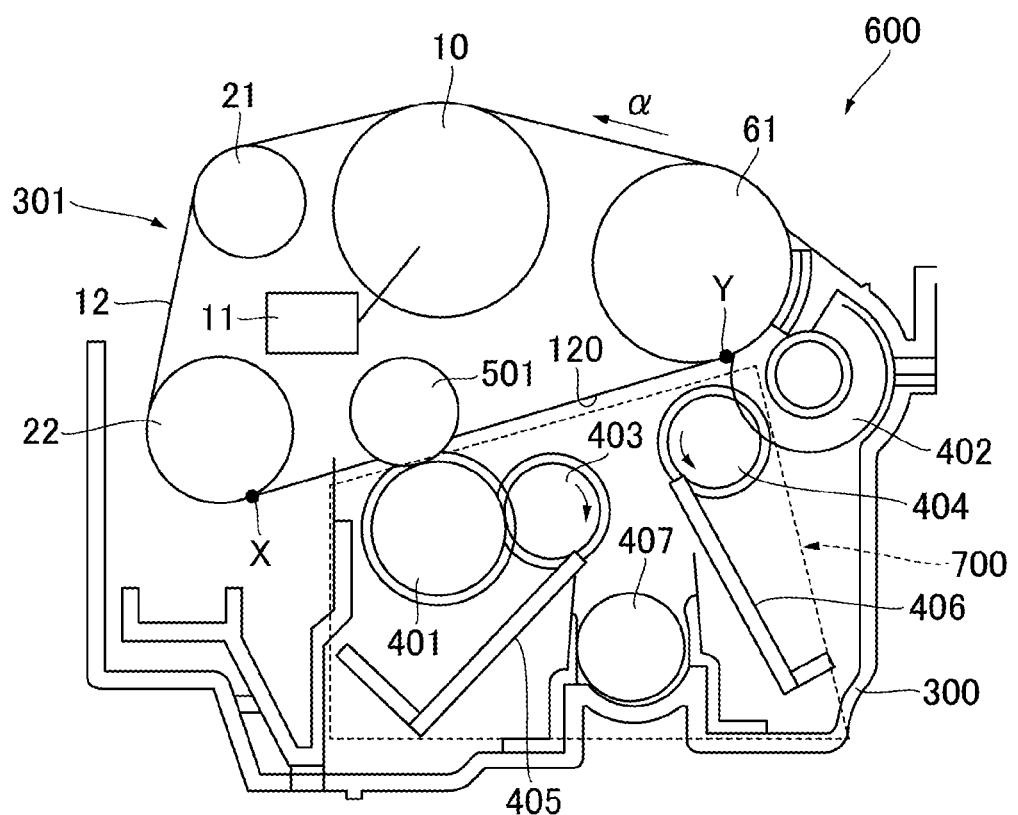
FIG. 2 is a schematic configuration sectional view of a secondary transfer device according to the first embodiment.

Next, a secondary transfer device 600 as the belt unit will be described with reference to FIGS. 2 to 4. As illustrated in FIG. 2, the secondary transfer device 600 includes a belt section 301 and a cleaning section 700. The belt section 301 includes the secondary transfer belt 12 described above. The cleaning section 700 cleans toner on the secondary transfer belt 12. Hereinbelow, detailed description will be made.

[Belt Section]

The belt section 301 includes the secondary transfer belt 12 as an endless rotatable belt which is capable of carrying a toner image on the outer peripheral surface thereof and a plurality of support rollers which supports the secondary transfer belt 12 in a tensioned state. The support rollers include the secondary transfer roller 10, the separation roller 21, a support roller 22, and a drive roller 61. The separation roller 21 is arranged on the downstream side of the secondary transfer roller 10 in the rotation direction α of the secondary transfer belt 12. Further, the support roller 22 and the drive roller 61 are arranged on the downstream side of the separation roller 21, and the secondary transfer roller 10 is disposed on the downstream side of the drive roller 61. The drive roller 61 is driven by a motor (not illustrated) to rotate the secondary transfer belt 12.

The secondary transfer roller 10 includes an elastic layer made of ionic conductive foamed rubber (NBR rubber) and a core metal. The outer diameter of the secondary transfer roller 10 is 24 mm. The surface roughness Rz of the secondary transfer roller 10 is 6.0 to 12.0 µm. The resistance of the secondary transfer roller 10 is 1E+5 to 1E+7Ω under the environment of 61° C. and 50% RH and with the application of 2 kV. The elastic layer has an Asker-C hardness of approximately 30 to 40. A secondary transfer high voltage power source 11 which is capable of variably supplying a secondary transfer bias is connected to the secondary transfer roller 10.

The secondary transfer belt 12 is formed of a resin such as polyimide or polycarbonate that contains an appropriate amount of carbon black as an antistatic additive. The volume resistivity of the secondary transfer belt 12 is 1E+9 to 1E 14 Ω·cm. The thickness of the secondary transfer belt 12 is 0.07 to 0.1 mm. A value of the Young's modulus of the secondary transfer belt 12 measured by a tension test (JIS K 6301) is approximately 100 MPa or more and 10 Gpa or less, which indicates sufficient hardness.

Figure 3A:
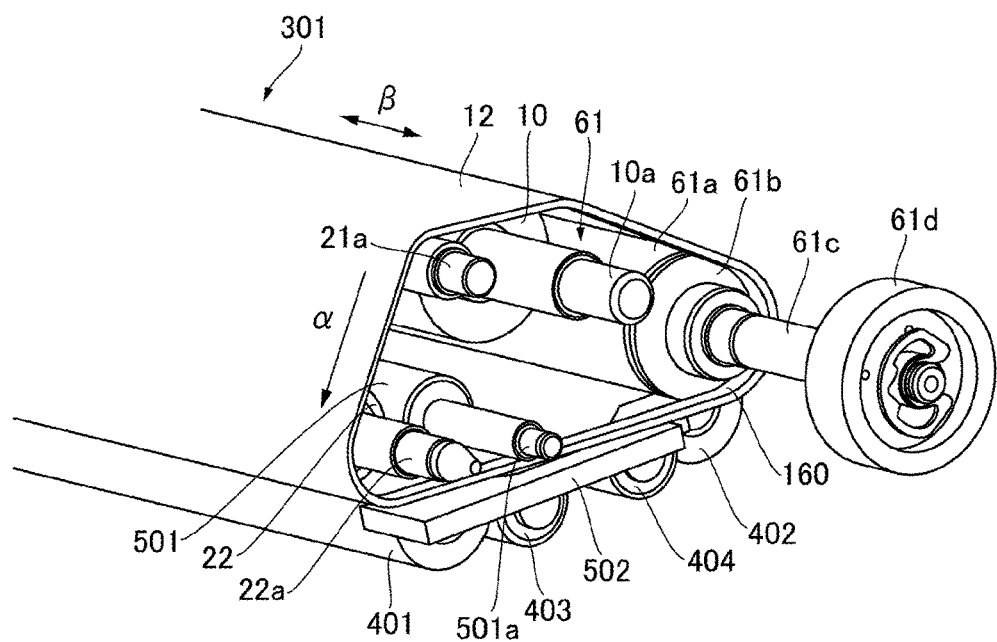
FIG. 3A is a perspective view of a belt section according to the first embodiment.
Figure 3B:
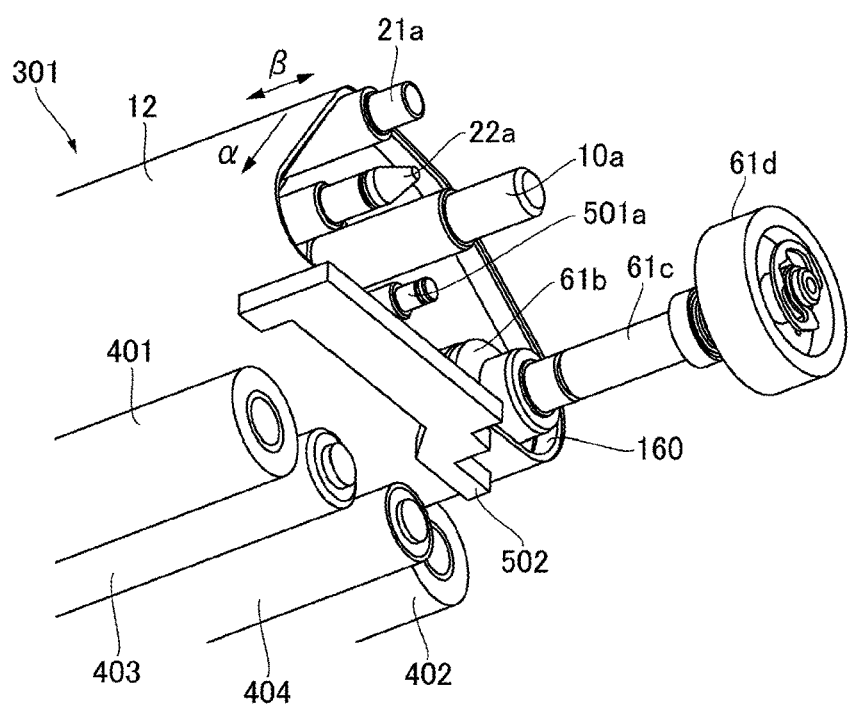
FIG. 3B is a perspective view of FIG. 3A viewed from the lower side.

As illustrated in FIGS. 3A and 3B, a restriction rib 160 as a restriction member is disposed on the inner peripheral surface of each end of the secondary transfer belt 12. On the other hand, a restriction roller 61b as an end member is disposed on each end in the axial direction of the drive roller 61 as a first roller which abuts against the inner peripheral surface of the secondary transfer belt 12. In the secondary transfer belt 12, the restriction rib 160 abuts against the restriction roller 61b which is disposed on the axial-direction end of the drive roller 61 to restrict the movement of the secondary transfer belt 12 in a width direction β which intersects the rotation direction α. That is, a deviation of the secondary transfer belt 12 is restricted by the abutment between the restriction rib 160 and the restriction roller 61b.

The restriction rib 160 is made of, for example, urethane rubber and stuck to the inner peripheral surface of each end in the width direction of the secondary transfer belt 12 so as to project inward from the inner peripheral surface of the secondary transfer belt 12. The drive roller 61 includes a roller portion 61a and the restriction roller 61b described above which is disposed on the end in the axial direction of the roller portion 61a. As illustrated in FIG. 4, the restriction roller 61b includes a chamfered part 610 which is formed on an end thereof. The chamfered part 610 abuts against the restriction rib 160 when the movement in the width direction of the secondary transfer belt 12 is restricted. The distance between axial-direction outer ends of the restriction rollers 61b which are located on the opposite sides in the axial direction, that is, the axial-direction length of the drive roller 61 is smaller than the distance between the restriction ribs 160 which are located on the opposite ends of the secondary transfer belt 12. The drive roller 61 is fixed to a rotation shaft 61c which is connected to a drive gear 61d connected to a drive motor (not illustrated).

On the other hand, each of the rollers disposed on the inner peripheral surface of the secondary transfer belt 12 except the drive roller 61 has an axial-direction length sufficiently shorter than the axial-direction length of the drive roller 61. This is because when the restriction rib 160 comes into contact with an end of the roller other than the drive roller 61, the restriction rib 160 disadvantageously climbs on the end.

In FIGS. 3A and 3B, only a rotation shaft fixed to each of the rollers projects relative to the restriction rib 160 of the secondary transfer belt 12, and each of the rollers which abuts against the inner peripheral surface of the secondary transfer belt 12 is present on the inner side in the width direction relative to the restriction rib 160. The secondary transfer roller 10 is fixed to a rotation shaft 10a. The separation roller 21 is fixed to a rotation shaft 21a. The support roller 22 is fixed to a rotation shaft 22a. Each of the rollers is rotatably supported by a frame (not illustrated) of the image forming apparatus 100 through the corresponding rotation shaft.

A counter roller 501 as a second roller is arranged between the support roller 22 and the drive roller 61 in the rotation direction α of the secondary transfer belt 12 in a manner to abut against the inner peripheral surface of the secondary transfer belt 12. That is, a surface of the secondary transfer belt 12 stretched between the support roller 22 and the drive roller 61 serves as a stretched surface 120. The counter roller 501 abuts against the inner peripheral surface of the secondary transfer belt 12 in a region where the stretched surface 120 is present. The counter roller 501 is also fixed to a rotation shaft 501a and rotatably supported by the frame (not illustrated) through the rotation shaft 501a.

The stretched surface 120 is present between ends of regions where the secondary transfer belt 12 is wound around the drive roller 61 and the support roller 22. That is, as illustrated in FIG. 2, a rotation-direction downstream end of the secondary transfer belt 12 in the region where the secondary transfer belt 12 is wound around the support roller 22 is denoted by X. Further, a rotation-direction upstream end of the secondary transfer belt 12 in the region where the secondary transfer belt 12 is wound around the drive roller 61 is denoted by Y. In this case, a region between X and Y on the outer peripheral surface of the secondary transfer belt 12 is defined as the stretched surface 120.

[Cleaning Section]

As illustrated in FIG. 2, the cleaning section 700 cleans toner adhered to the outer peripheral surface of the secondary transfer belt 12. Various types of toner are transferred onto the secondary transfer belt 12 from the intermediate transfer belt 40. For example, fogging toner between recoding media, a toner image for control, and a toner image left at the time of jam may be transferred to the secondary transfer belt 12 from the intermediate transfer belt 40. The jam refers to a case where a recoding medium gets stuck in any of conveyance paths. At this time, the image forming apparatus 100 may come to a stop with a toner image left on the photosensitive drum or the intermediate transfer belt. In this case, the left toner image may be transferred to the secondary transfer belt 12 from the intermediate transfer belt 40.

The toner image transferred to the secondary transfer belt 12 in this manner is cleaned by the cleaning section 700. Thus, the cleaning section 700 includes an upstream side fur brush 401 and a downstream side fur brush 402. The downstream side fur brush 402 as a first cleaning member is arranged at a position that faces the drive roller 61 with the secondary transfer belt 12 interposed therebetween, and abuts against the outer peripheral surface of the secondary transfer belt 12 to remove toner adhered to the secondary transfer belt 12. The upstream side fur brush 401 as a second cleaning member is arranged on the upstream side in the rotation direction of the secondary transfer belt 12 relative to the downstream side fur brush 402. In particular, the upstream side fur brush 401 is arranged at a position that faces the counter roller 501 with the secondary transfer belt 12 interposed therebetween, and abuts against the outer peripheral surface of the secondary transfer belt 12 to remove toner adhered to the secondary transfer belt 12. In other words, the counter roller 501 is a roller that faces the upstream side fur brush 401 with the secondary transfer belt 12 interposed therebetween.

Each of the upstream side fur brush 401 and the downstream side fur brush 402, for example, includes a core metal and conductive nylon implanted in the core metal. Further, an upstream side collecting roller 403 and a downstream side collecting roller 404 are arranged in such a manner that the upstream side collecting roller 403 and the downstream side collecting roller 404 respectively enter the upstream side fur brush 401 and the downstream side fur brush 402 by a predetermined amount. Voltages having different polarities are applied to the upstream side collecting roller 403 and the downstream side collecting roller 404 from power sources (not illustrated). Further, an upstream side cleaning blade 405 and a downstream side cleaning blade 406 abut against the upstream side collecting roller 403 and the downstream side collecting roller 404, respectively.

The toner transferred to the secondary transfer belt 12 is transferred to the upstream side fur brush 401 from the secondary transfer belt 12 by a bias applied to the upstream side collecting roller 403. Then, the toner transferred to the upstream side fur brush 401 is further transferred to the upstream side collecting roller 403 and cleaned by the upstream side cleaning blade 405. A positive bias is applied to the upstream side collecting roller 403. Thus, toner having a negative polarity, which is the same as toner at the time of development, is collected to the upstream side fur brush 401 from the secondary transfer belt 12. The most of toner having a negative polarity collected to the upstream side fur brush 401 is transferred to the upstream side collecting roller 403 and removed by the upstream side cleaning blade 405.

However, some toner that has been transferred to the upstream side fur brush 401 from the secondary transfer belt 12 is not transferred to the upstream side collecting roller 403 from the upstream side fur brush 401. Such toner returns to the secondary transfer belt 12 from the upstream side fur brush 401 when the toner passes through the upstream side collecting roller 403 and comes into contact with the secondary transfer belt 12. The toner has a positive polarity. Thus, the toner having a positive polarity on the secondary transfer belt 12 is transferred to the downstream side fur brush 402 by applying a bias having a negative polarity the downstream side collecting roller 404. Then, the toner transferred to the downstream side fur brush 402 is transferred to the downstream side collecting roller 404 and then removed by the downstream side cleaning blade 406. The fur brushes 401, 402, the collecting rollers 403, 404, and the cleaning blades 405, 406 are arranged inside a toner collecting container 300.

The toner collecting container 300 collects and discharges toner cleaned by the cleaning section 700. A collecting screw 407 is arranged in the lower part of the toner collecting container 300. The collecting screw 407 is arranged below an abutment portion between the upstream side cleaning blade 405 and the upstream side collecting roller 403 and an abutment portion between the downstream side cleaning blade 406 and the downstream side collecting roller 404. Thus, toner collected by each of the cleaning blades 405, 406 drops onto the collecting screw 407 which is located immediately below each of the cleaning blades 405, 406 inside the toner collecting container 300, and is conveyed to a collecting toner path and discharged through a discharge port.

At this time, toner scraped off by each of the cleaning blades 405, 406 and each of the fur brushes 401, 402 is filled near a contact surface between the cleaning section 700 and the secondary transfer belt 12. The toner filled inside the toner collecting container 300 may leak out of the toner collecting container 300 through a gap between the toner collecting container 300 and the secondary transfer belt 12.

When the toner scatters out of the toner collecting container 300, the inside of the image forming apparatus 100 becomes contaminated with the toner. Thus, in the present embodiment, as illustrated in FIGS. 3A and 3B, a brush 502 as an abutment member is arranged near the contact surface between the cleaning section 700 and the secondary transfer belt 12. The brush 502 prevents toner from scattering through the gap between the secondary transfer belt 12 and the toner collecting container 300.

[Arrangement of Brush]

Next, the arrangement of the brush 502 described above which prevents the scattering of toner will be described with reference to FIG. 4. FIG. 4 illustrates the positional relationship in the width direction between principal elements of the secondary transfer device 600 and illustrates the secondary transfer belt 12 and the rollers located therein in an arrayed manner in the belt rotation direction α for convenience. Further, FIG. 4 illustrates a recording medium P having the maximum size that can be used in the image forming apparatus 100 and a toner image t having the maximum size that can be formed by the image forming apparatus 100 in a manner to overlap the secondary transfer belt 12. The toner image t corresponds to a carrying region capable of carrying the toner image on the secondary transfer belt 12.

A width B of the secondary transfer belt 12 is larger than a width S of the corresponding recording medium P having the maximum size. Further, a distance K in the width direction within which the restriction roller 61b restricts the deviation of the secondary transfer belt 12 is smaller than the width B of the secondary transfer belt 12 by the sum of the width of the restriction rib 160 and a movement play of the secondary transfer belt 12. The distance K is the distance between inner ends of the chamfered parts 610.

A length in the axial direction (the direction that is substantially the same as the width direction of the secondary transfer belt 12) of each of the fur brushes 401, 402 is larger than a width T of the toner image t having the maximum size that may be transferred so as to clean toner transferred to the secondary transfer belt 12. Thus, a length C in the axial direction (the direction that is substantially the same as the width direction of the secondary transfer belt 12) of the counter roller 501 which faces the upstream side fur brush 401 with the secondary transfer belt 12 interposed therebetween is also larger than the width T of the toner image t having the maximum size.

When each configuration is set within the minimum range under the above conditions, an arrangeable region 510 where the brush 502 can be arranged (the cross-hatched region in FIG. 4) is located on the outer side in the width direction relative to the width T of the toner image t. Further, a width-direction inner end of the arrangeable region 510 is located on the inner side in the width direction relative to the width B of the secondary transfer belt 12. Thus, the brush 502 as the abutment member abuts against the outer peripheral surface of the secondary transfer belt 12 on the outer side in the width direction of the secondary transfer belt 12 relative to the carrying region capable of carrying the toner image. In the present embodiment, the brush 502 is disposed on the outer peripheral surface of the secondary transfer belt 12 at each end in the width direction thereof.

The position of the brush 502 in the rotation direction α of the secondary transfer belt 12 corresponds to at least a region where the counter roller 501 is located and a part of the region where the secondary transfer belt 12 is wound around the drive roller 61 on the stretched surface 120 of the secondary transfer belt 12. In the present embodiment, the brush 502 abuts against the secondary transfer belt 12 continuously over a range including these regions. That is, in order to close the gap between the secondary transfer belt 12 and the toner collecting container 300 with the brush 502, the brush 502 is disposed continuously over a certain degree of range also in the rotation direction α of the secondary transfer belt 12.

A range in the rotation direction α in which the brush 502 abuts against the secondary transfer belt 12 is preferably set in the following manner. First, it is preferred that a rotation-direction upstream end of the secondary transfer belt 12 in this range be located on the downstream side relative to an upstream end of the secondary transfer belt 12 in a region against which the upstream side fur brush 401 abuts. This is because toner is likely to fly in the region against which the upstream side fur brush 401 abuts due to entry of toner on the secondary transfer belt 12 into this region. On the other hand, it is preferred that a rotation-direction downstream end of the secondary transfer belt 12 in this range be located on the downstream side relative to an upstream end of the secondary transfer belt 12 in a region against which the downstream side fur brush 402 abuts. This is because, in the region against which the downstream side fur brush 402 abuts, toner on the secondary transfer belt 12 is largely removed by the upstream side fur brush 401, and the amount of toner that enters the region against which the downstream side fur brush 402 abuts is thus small. Thus, it is preferred that a downstream end in the range in the rotation direction α in which the brush 502 abuts against the secondary transfer belt 12 include the upstream end of the secondary transfer belt 12 in the region against which the downstream side fur brush 402 abuts.

In the present embodiment, the downstream side fur brush 402 is arranged in a manner to abut against the region where the secondary transfer belt 12 is wound around the drive roller 61 so as to face the drive roller 61 which supports the secondary transfer belt 12 in a tensioned state. Thus, the region against which the downstream side fur brush 402 abuts corresponds to a range on the downstream side relative to the stretched surface 120. However, the brush 502 includes a plate-like member which is disposed along the stretched surface 120 and bristles made of, for example, resin which are implanted in the plate-like member, and does not abut against the downstream side of a part that is curved along the curvature of the drive roller 61 from the stretched surface 120. That is, the range of abutment of the bristles implanted in the plate-like member extending along the stretched surface 120 corresponds to the range in which the brush 502 abuts against the secondary transfer belt 12 in a part corresponding to the drive roller 61.

In the present embodiment, also in such a configuration, a part of the brush 502 abuts against the secondary transfer belt 12 on the outer side in the width direction of the range that includes the upstream end of the secondary transfer belt 12 in the region against which the downstream side fur brush 402 abuts. Further, the plate-like member of the brush 502 may be bent along the curvature of the drive roller 61 so that the brush 502 abuts against the secondary transfer belt 12 in the entire range in the rotation direction α of the abutment of the downstream side fur brush 402.

In any case, the abutment region where the brush 502 abuts against the secondary transfer belt 12 includes the outer peripheral surface of the secondary transfer belt 12 in a first region E1 where the drive roller 61 is located and a second region E2 where the counter roller 501 is located in the rotation direction α of the secondary transfer belt 12. Thus, a problem as described below may occur depending on the abutment region of the brush 502. This point will be described with reference to Comparative Examples 1 to 3.

Comparative Example 1

Figure 5A:
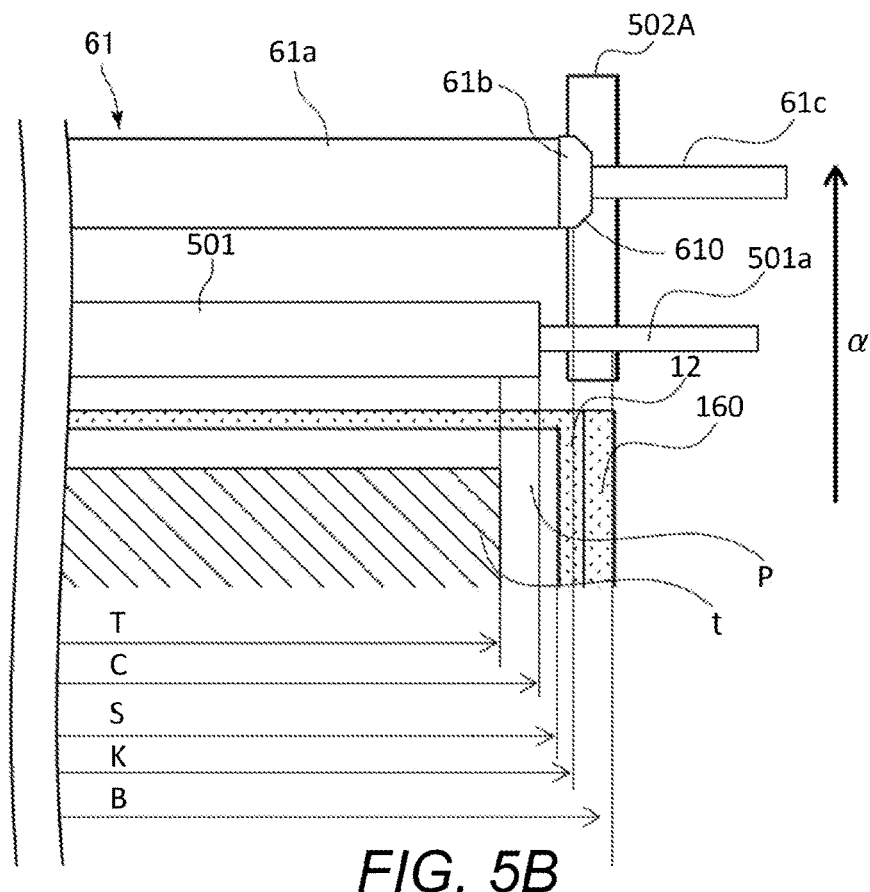
FIG. 5A is a schematic diagram illustrating the arrangement relationship between each roller and a brush in Comparative Example 1.

Comparative Example will be described with reference to FIGS. 5A and 5B. In Comparative Example 1, an abutment region where a brush 502A abuts against the secondary transfer belt 12 is set to a range that overlaps the restriction roller 61b of the drive roller 61. Each part illustrated in FIG. 5A is similar to that of FIG. 4. In Comparative Example 1, the brush 502A is arranged within the range of the arrangeable region 510 of FIG. 4.

Figure 5B:
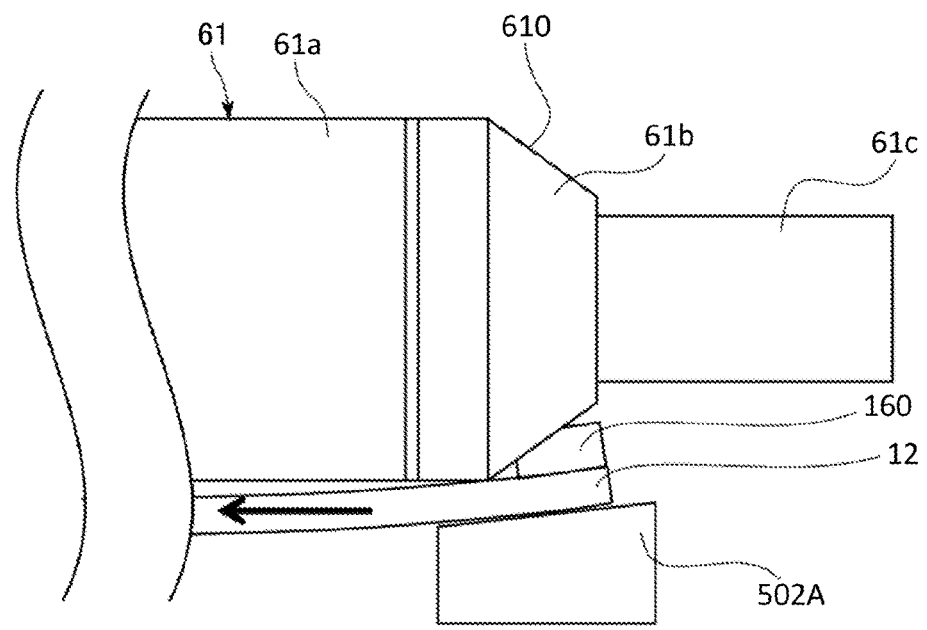
FIG. 5B is a diagram describing the behavior of a rib in Comparative Example 1.

However, in Comparative Example 1, since the brush 502A is arranged at a position that faces the restriction roller 61b with the secondary transfer belt 12 interposed therebetween, the brush 502A disadvantageously presses the end of the secondary transfer belt 12 toward the restriction roller 61b as illustrated in FIG. 5B. As a result, the secondary transfer belt 12 may buckle, which may change the attitude of the restriction rib 160 which is disposed on the inner peripheral surface of the width-direction end of the secondary transfer belt 12. Accordingly, the restriction rib 160 may climb over the chamfered part 610 of the restriction roller 61b, and the secondary transfer belt 12 may be over-displaced.

Comparative Example 2

Figure 6A:
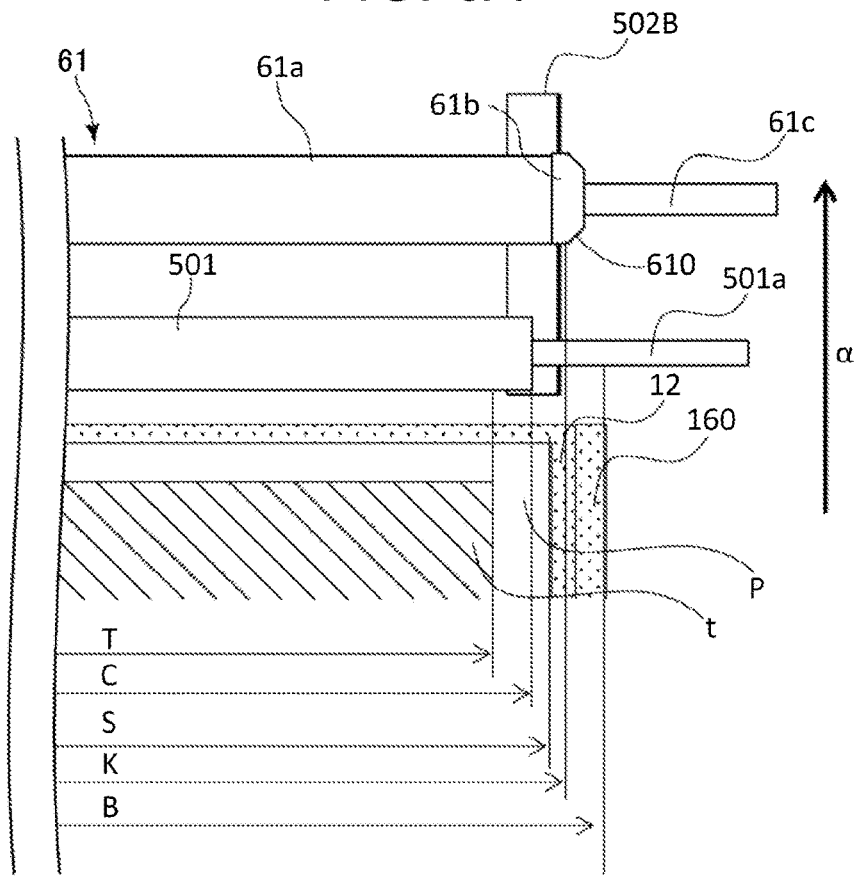
FIG. 6A is a schematic diagram illustrating the arrangement relationship between each roller and a brush in Comparative Example 2.
Figure 6B:
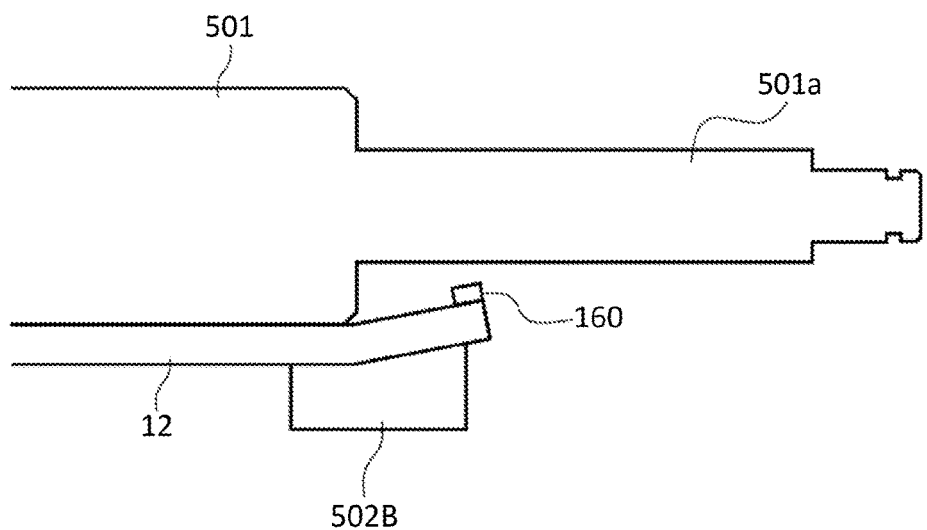
FIG. 6B is a diagram describing the behavior of a belt on an end of a counter roller in Comparative Example 2.

Comparative Example 2 will be described with reference to FIGS. 6A and 6B. In Comparative Example 2, an abutment region where a brush 502B abuts against the secondary transfer belt 12 is set to a range that extends across the width-direction end of the counter roller 501. Each part illustrated in FIG. 6A is similar to that of FIG. 4. Also in Comparative Example 2, the brush 502B is arranged within the range of the arrangeable region 510 of FIG. 4.

However, in Comparative Example 2, the brush 502B is arranged at a position that faces the width-direction end of the counter roller 501 with the secondary transfer belt 12 interposed therebetween. Thus, as illustrated in FIG. 6B, the brush 502B disadvantageously presses the secondary transfer belt 12 toward the end of the counter roller 501. This increases a stress produced by the bending of the secondary transfer belt 12 on the end of the counter roller 501 caused by the pressing by the brush 502B. Thus, every time the secondary transfer belt 12 passes through the end of the counter roller 501 by rotation, a large stress repeatedly acts thereon, which may reduce the life of the secondary transfer belt 12.

[Configuration of Brush]

Figure 8A:
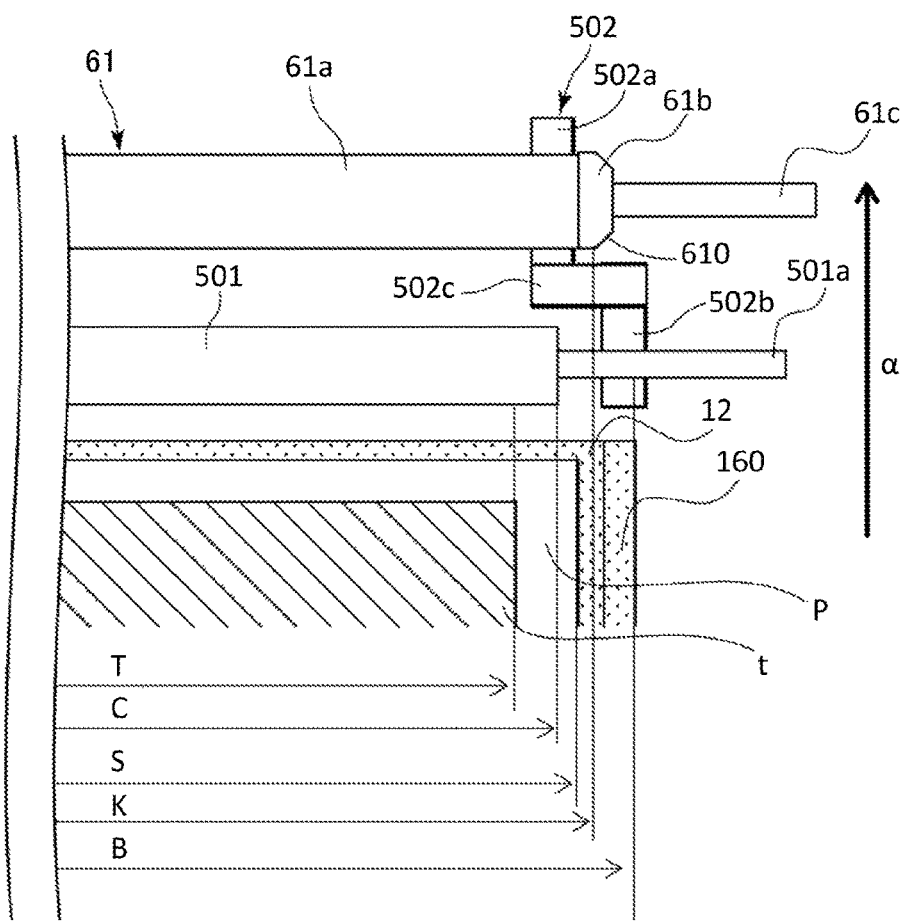
FIG. 8A is a schematic diagram illustrating the arrangement relationship between each roller and the brush in the first embodiment.
Figure 8B:
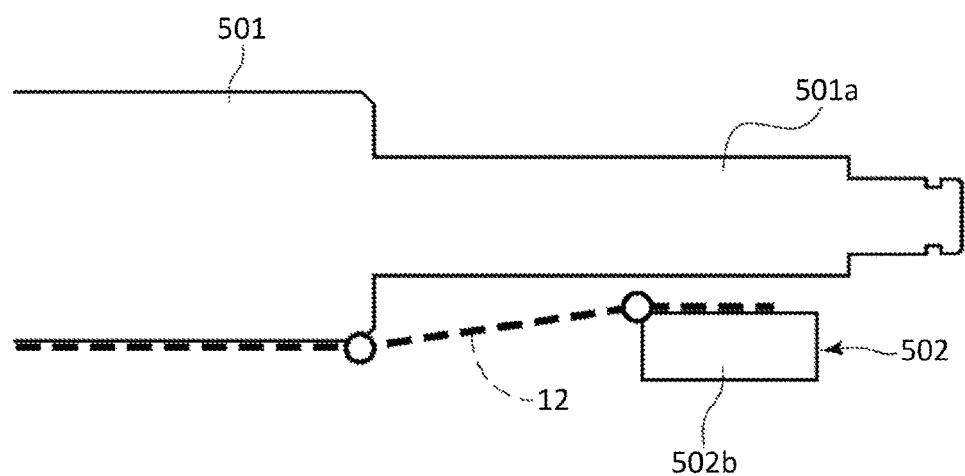
FIG. 8B is a diagram describing the behavior of a belt on an end of a counter roller in the first embodiment.

Thus, in the present embodiment, the brush 502 is configured as illustrated in FIGS. 8A and 8B. That is, as illustrated in FIG. 8A, the brush 502 is bent so that the brush 502 abuts against the secondary transfer belt 12 at different positions in the width direction in the first region E1 and the second region E2 (refer to FIG. 4). Specifically, in the brush 502, the abutment region that abuts against the outer peripheral surface of the secondary transfer belt 12 with respect to the outer peripheral surface of the secondary transfer belt 12 of the first region E1 is located on the inner side in the width direction relative to the region of the axial-direction end of the drive roller 61 which is abuttable against the restriction rib 160. That is, the abutment region of the brush 502 in the first region E1 is located on the inner side in the width direction relative to the chamfered part 610 of the restriction roller 61b. In the present embodiment, the abutment region of the brush 502 with respect to the outer peripheral surface of the secondary transfer belt 12 in the first region E1 is located on the inner side in the width direction relative to the restriction roller 61b.

Further, in the brush 502, the abutment region that abuts against the outer peripheral surface of the secondary transfer belt 12 with respect to the outer peripheral surface of the secondary transfer belt 12 of the second region E2 is located on the outer side in the width direction relative to the axial-direction end of the counter roller 501. That is, the abutment region of the brush 502 in the second region E2 faces the rotation shaft 501a with the secondary transfer belt 12 interposed therebetween on the outer side relative to the width-direction end of the counter roller 501.

In other words, the brush 502 includes a first abutment portion 502a which abuts against the outer peripheral surface of the secondary transfer belt 12 in the first region E1 and a second abutment portion 502b which abuts against the outer peripheral surface of the secondary transfer belt 12 in the second region E2. When the secondary transfer belt 12 viewed in the thickness direction, the first abutment portion 502a abuts against the outer peripheral surface of the secondary transfer belt 12 at a position that overlaps the roller portion 61a of the drive roller 61. Further, when the secondary transfer belt 12 is viewed in the thickness direction, the second abutment portion 502b abuts against the outer peripheral surface of the secondary transfer belt 12 at a position where the counter roller 501 does not abut against the secondary transfer belt 12 on the outer side relative to the width-direction end of the counter roller 501.

The brush 502 also includes a third abutment portion 502c in addition to the first abutment portion 502a and the second abutment portion 502b. The third abutment portion 502c abuts against the outer peripheral surface of the secondary transfer belt 12 in a third region E3 (refer to FIG. 4) which is located between the first region E1 and the second region E2 in the rotation direction α of the secondary transfer belt 12 and connects the first abutment portion 502a and the second abutment portion 502b to each other. As illustrated in FIG. 8A, the first abutment portion 502a and the second abutment portion 502b are arranged in substantially parallel to the rotation direction α at different positions in the width direction. In the present embodiment, a part of the first abutment portion 502a and a part of the second abutment portion 502b abut against the outer peripheral surface of the secondary transfer belt 12 in the third region E3. On the other hand, the third abutment portion 502c is arranged in a direction that is substantially perpendicular to the rotation direction α so as to connect an end of the first abutment portion 502a and an end of the second abutment portion 502b to each other. The third abutment portion 502c may be inclined with respect to the rotation direction α.

The brush 502 configured in the above manner is formed in a substantially crank shape so that the first abutment portion 502a and the second abutment portion 502b abut against the secondary transfer belt 12 at different positions in the width direction. In particular, the second abutment portion 502b is sufficiently separated from the width-direction end of the counter roller 501 toward the outer side in the width direction. Thus, as illustrated in FIG. 8B, it is possible to reduce a bend amount of the secondary transfer belt 12 on the width-direction end of the counter roller 501 and thus reduce a stress produced by the bending of the secondary transfer belt 12 on the end of the counter roller 501 caused by pressing by the brush 502.

Figure 9:
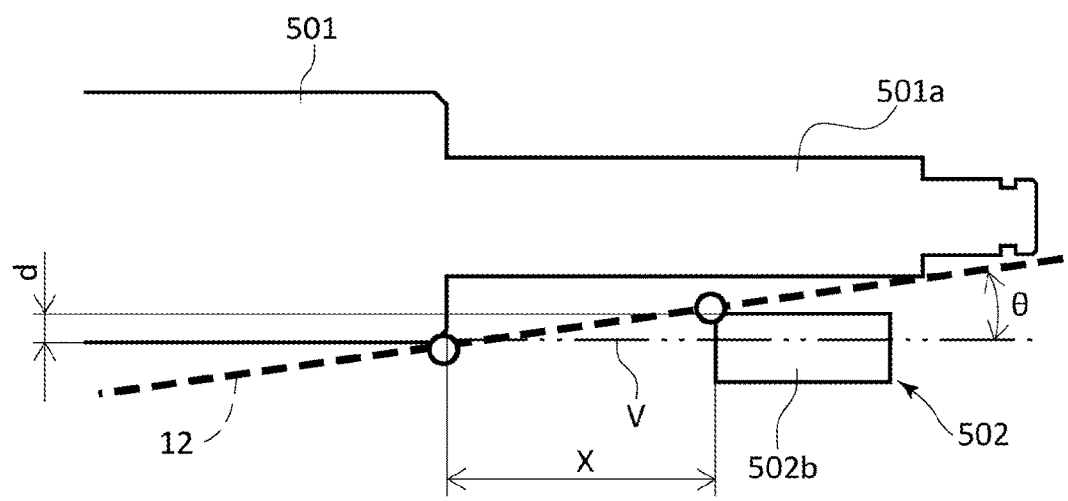
FIG. 9 is a diagram describing the arrangement relationship between the end of the counter roller and the brush in the first embodiment.

In particular, in the present embodiment, the second abutment portion 502b is arranged at a position that satisfies the following conditions. As illustrated in FIG. 9, x denotes the distance between the width-direction inner end of the second abutment portion 502b and the axial-direction end (the width-direction end) of the counter roller 501, and d denotes an entry amount of the brush 502 into a virtual cylindrical surface V which is formed by extending the outer diameter of the counter roller 501 in the axial direction. In this case, the second abutment portion 502b is arranged so as to satisfy $\tan^{-1} (d/x) < 5°$.

Figure 10:
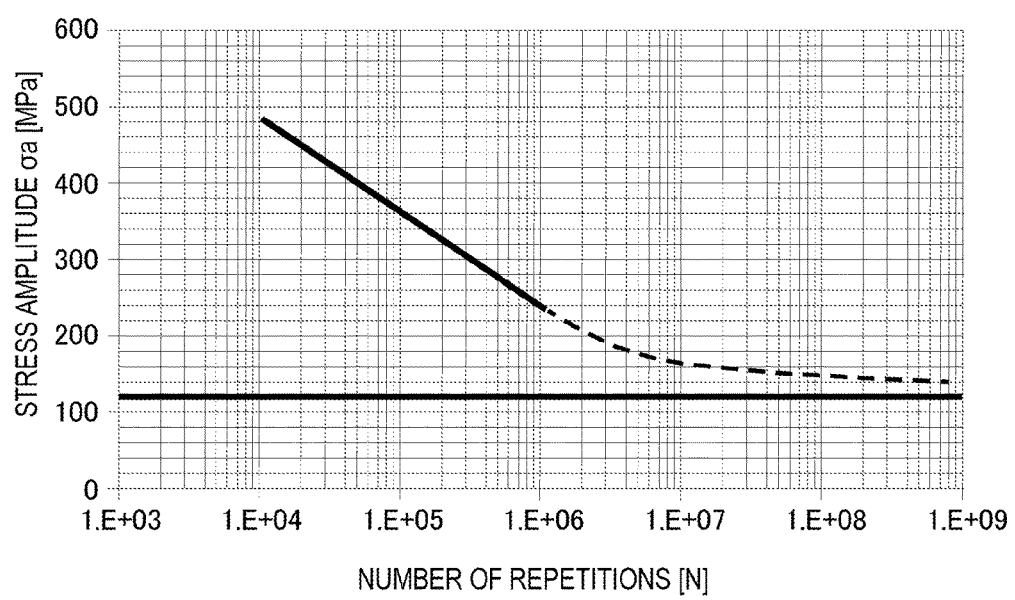
FIG. 10 is a fatigue limit diagram of the belt in the first embodiment.

An angle formed by the distance x and the entry amount d can be made approximate to an angle of bending of the secondary transfer belt 12 caused by pressing by the second abutment portion 502b, and the angle is referred to as a bend angle θ. Since $\tan θ = d/x$, $θ = \tan^{-1} (d/x)$ is satisfied. In the secondary transfer belt 12 used in the present embodiment, a fatigue limit diagram of the belt by a repetitive bending stress is as illustrated in FIG. 10. FIG. 10 shows that the number of repetitions levels off at a stress of approximately 120 MPa. Thus, it is possible to obtain a sufficient durability of the belt by arranging the brush 502 so as to make a load stress caused by bending equal to or less than approximately 120 MPa.

Figure 11:
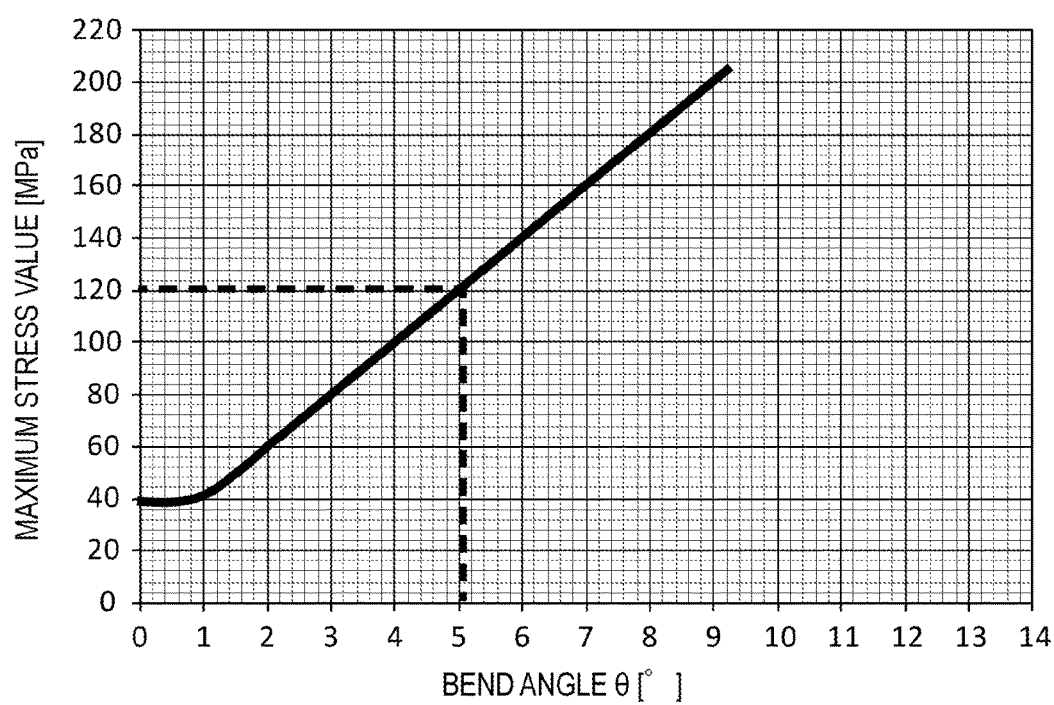
FIG. 11 is a graph illustrating the relationship between a bend angle and a stress applied to the belt.

FIG. 11 illustrates the relationship between the bend angle θ of the secondary transfer belt 12 and a maximum stress value at the corresponding time. The bend angle θ is an angle that is obtained from x and d described above and an angle of a line that connects the width-direction end of the outer peripheral surface of the counter roller 501 to the width-direction inner end of the abutment surface of the second abutment portion 502b against the secondary transfer belt 12 with respect to a central axis of the counter roller 501. FIG. 11 shows that the load stress to the secondary transfer belt 12 is 120 MPa when θ is 5°. Thus, in the present embodiment, the second abutment portion 502b is arranged so as to satisfy θ<5°, that is, $\tan^{-1} (d/x) < 5°$. As clearly shown in FIG. 10, it is possible to obtain a sufficient durability of the secondary transfer belt 12 by satisfying the above condition.

In the present embodiment as described above, it is possible to prevent capsizing of the secondary transfer device 600, and also prevent climbing of the restriction rib 160 and a reduction in the belt life. That is, the brush 502 abuts against the outer peripheral surface of the secondary transfer belt 12 on the inner side in the width direction relative to the chamfered part 610 of the restriction roller 61b in the first region E1 where the drive roller 61 is located. Thus, the restriction rib 160 of the secondary transfer belt 12 is not pressed as described in Comparative Example 1 illustrated in FIGS. 5A and 5B. Therefore, it is possible to prevent the restriction rib 160 from climbing on the restriction roller 61b.

Further, the brush 502 abuts against the outer peripheral surface of the secondary transfer belt 12 on the outer side in the width direction relative to the axial-direction end of the counter roller 501 in the second region E2 where the counter roller 501 is located. In particular, the second abutment portion 502b which abuts against the outer peripheral surface of the secondary transfer belt 12 in the second region E2 is arranged at the position that satisfies $\tan^{-1} (d/x) < 5°$. Thus, it is possible to reduce the stress produced by bending of the secondary transfer belt 12 on the end of the counter roller 501 caused by pressing by the brush 502 and thus prevent a reduction in the life of the secondary transfer belt 12.

Further, the brush 502 abuts against the secondary transfer belt 12 at different positions in the width direction of the secondary transfer belt 12 in the first region E1 and the second region E2. Thus, it is possible to arrange the brush 502 as described above without increasing the length in the axial direction of the counter roller 501, the distance in the width direction within which the restriction roller 61b restricts the deviation of the secondary transfer belt 12, and the width of the secondary transfer belt 12. As a result, it is possible to prevent capsizing of the secondary transfer device 600.

In the above description, the brush 502 is formed of an integral plate-like member. However, the brush 502 may be divided into a plurality of pieces. For example, the first abutment portion 502a and the second abutment portion 502b may be separated. Further, for example, felt may be used instead of the brush as the member that prevents scattering of toner.

Figure 12:
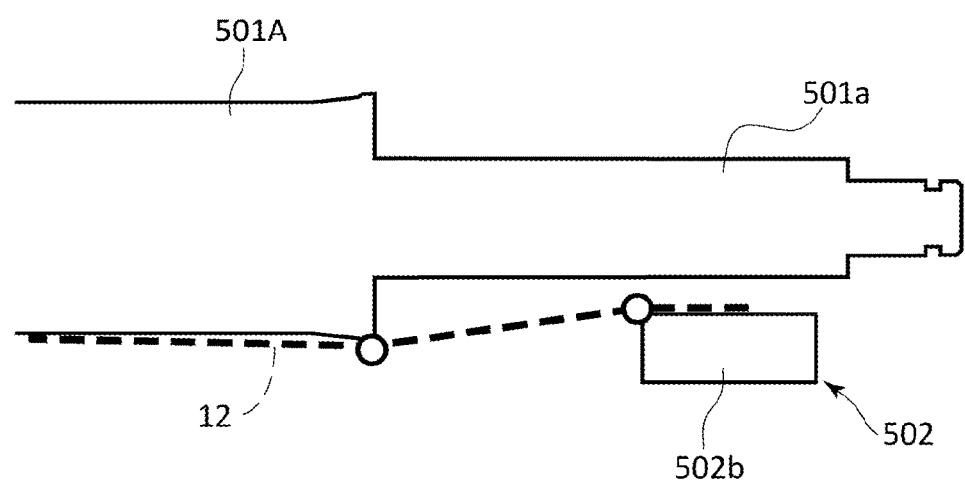
FIG. 12 is a diagram describing the behavior of the belt on the end of the counter roller in another example of the first embodiment.

In the above description, the counter roller 501 as the second roller has a straight shape having a cylindrical outer peripheral surface. However, the second roller may have a shape other than the straight shape. For example, the second roller may be a counter roller 501A having a crown shape as illustrated in FIG. 12.

Second Embodiment

Figure 13:
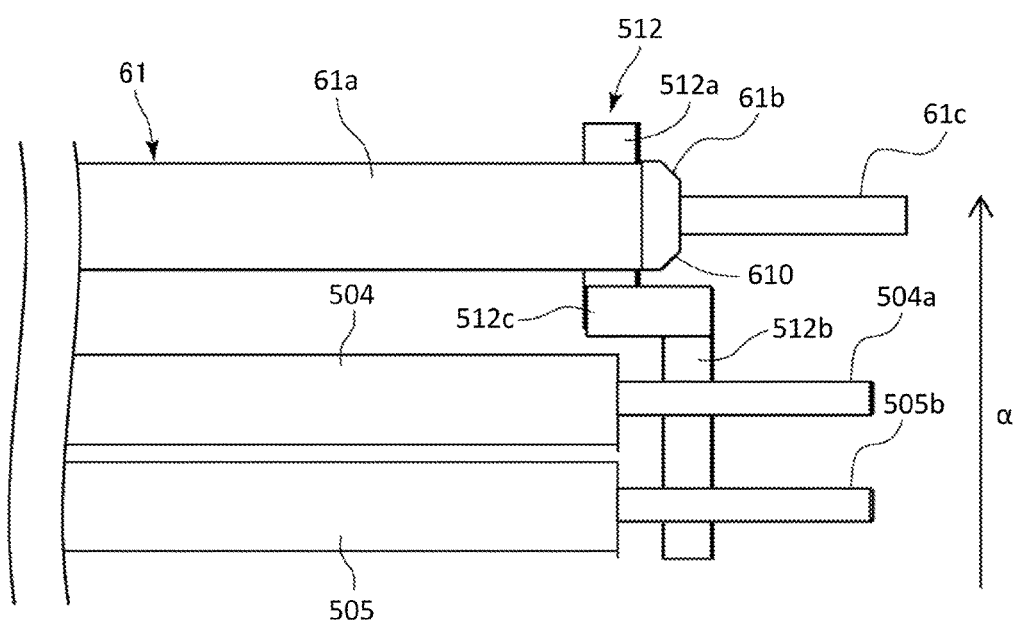
FIG. 13 is a schematic diagram illustrating the arrangement relationship between each roller and a brush in a second embodiment.

A second embodiment will be described with reference to FIG. 13. In the present embodiment, a plurality of second rollers is provided. The other configuration and action are similar to those of the first embodiment described above. Thus, repetitive description and illustration will be omitted or simplified, and a part different from the first embodiment will be mainly described hereinbelow.

Each of rollers 504, 505 as the second roller abuts against the inner peripheral surface of a secondary transfer belt and has an axial-direction length shorter than that of a drive roller 61 as the first roller. In this case, a brush 512 as the abutment member includes a first abutment portion 512a, a second abutment portion 512b, and a third abutment portion 512c which connects the first abutment portion 512a and the second abutment portion 512b to each other. The first abutment portion 512a abuts against the outer peripheral surface of the secondary transfer belt on the inner side in the width direction relative to a restriction roller 61b in a first region where the drive roller 61 is located in a manner similar to the first embodiment.

On the other hand, the second abutment portion 512b abuts against the secondary transfer belt on the outer side in the width direction relative to axial-direction ends of the rollers 504, 505 in a second region where the two rollers 504, 505 are located. The position of the second abutment portion 512b with respect to the axial-direction ends of the rollers 504, 505 is similar to that of the first embodiment. The third abutment portion 512c abuts against the outer peripheral surface of the secondary transfer belt in a third region which is located between the first region and the second region. Also in the present embodiment, it is possible to prevent upsizing of the secondary transfer device, and also prevent climbing of the restriction rib and a reduction in the belt life in a manner similar the first embodiment.

Third Embodiment

Figure 14:
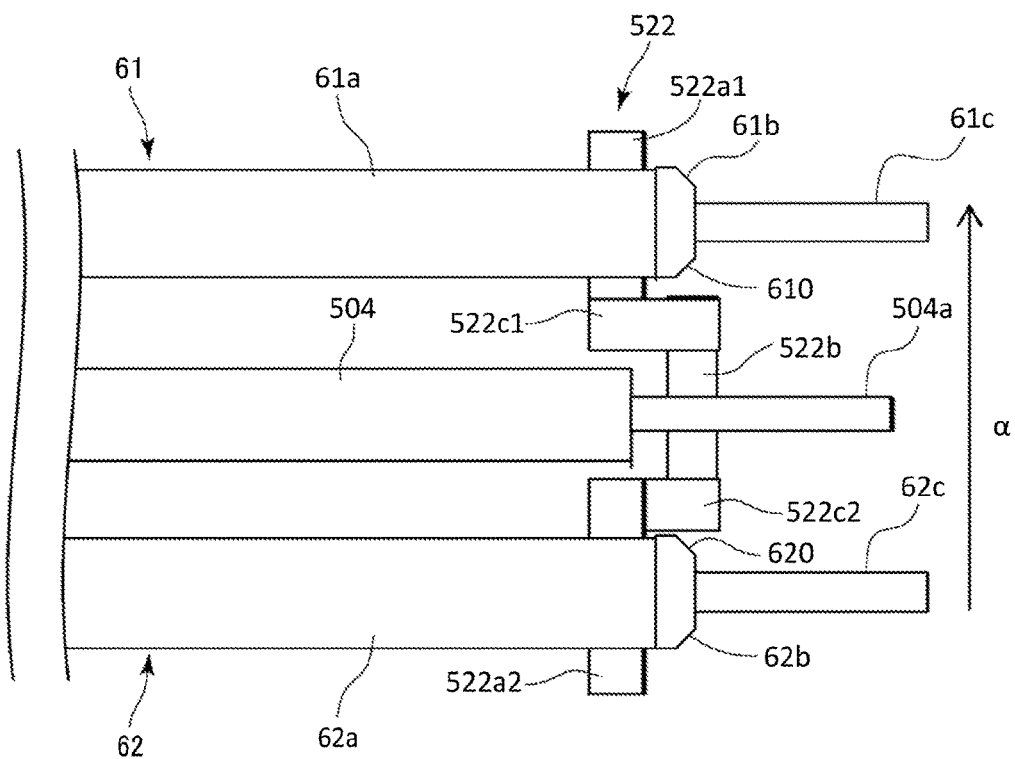
FIG. 14 is a schematic diagram illustrating the arrangement relationship between each roller and a brush in a third embodiment.

A third embodiment will be described with reference to FIG. 14. In the present embodiment, a plurality of first rollers is provided. The other configuration and action are similar to those of the first embodiment described above. Thus, repetitive description and illustration will be omitted or simplified, and a part different from the first embodiment will be mainly described hereinbelow.

A roller 62 as the first roller includes a roller portion 62a and a restriction roller 62b as the end member in a manner similar to the drive roller 61. The restriction roller 62b is disposed on an axial-direction end of the roller portion 62a and includes a chamfered part 620 which abuts against a restriction rib when a movement in the width direction of a secondary transfer belt is restricted. The roller 62 is rotatably supported through a rotation shaft 62c. Further, a roller 504 as the second roller is arranged between the drive roller 61 and the roller 62 and has an axial-direction length shorter than that of the drive roller 61 and the roller 62.

In the present embodiment, a brush 522 as the abutment member includes two first abutment portions 522a1, 522a2, and a second abutment portion 522b. The first abutment portion 522a1 and the second abutment portion 522b are connected through a third abutment portion 522c1. The first abutment portion 522a2 and the second abutment portion 522b are connected through a third abutment portion 522c2. That is, in the present embodiment, since the drive roller 61 and the rollers 504, 62 are arranged as described above, the brush 522 has a shape as illustrated in FIG. 14.

In this case, the first abutment portion 522a1 abuts against the outer peripheral surface of the secondary transfer belt on the inner side in the width direction relative to the restriction roller 61b in a first region where the drive roller 61 is located in a manner similar to the first embodiment. The first abutment portion 522a2 abuts against outer peripheral surface of the secondary transfer belt on the inner side in the width direction relative to the restriction roller 62b in a first region where the roller 62 is located. The first abutment portion 522a2 may be located on the inner side in the width direction relative to the chamfered part 620 in a manner similar to the first embodiment.

On the other hand, the second abutment portion 522b abuts against the secondary transfer belt on the outer side in the width direction relative to the axial-direction end of the roller 504 in a second region where the roller 504 is located. The position of the second abutment portion 522b with respect to the axial-direction end of the roller 504 is similar to that of the first embodiment. The third abutment portions 522c1, 522c2 abut against the outer peripheral surface of the secondary transfer belt in a third region which is located between the first region and the second region. Also in the present embodiment, it is possible to prevent capsizing of the secondary transfer device, and also prevent climbing of the restriction rib and a reduction in the belt life in a manner similar to the first embodiment.

Fourth Embodiment

Figure 15:
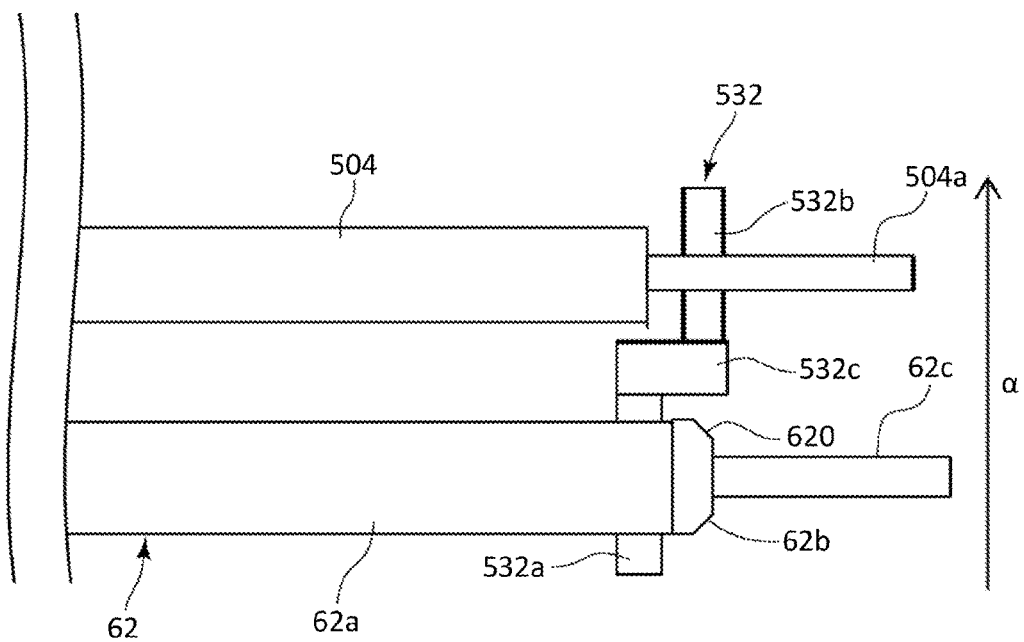
FIG. 15 is a schematic diagram illustrating the arrangement relationship between each roller and a brush in a fourth embodiment.

A fourth embodiment will be described with reference to FIG. 15. In the present embodiment, the arrangement of the first roller and the second roller differs from that of the first embodiment. The other configuration and action are similar to those of the first embodiment described above. Thus, repetitive description and illustration will be omitted or simplified, and a part different from the first embodiment will be mainly described hereinbelow.

A roller 62 as the first roller includes a roller portion 62a and a restriction roller 62b as the end member. The restriction roller 62b is disposed on an axial-direction end of the roller portion 62a and includes a chamfered part 620 which abuts against a restriction rib when a movement in the width direction of a secondary transfer belt is restricted. The roller 62 is rotatable supported through a rotation shaft 62c.

In the present embodiment, a roller 504 as the second roller is arranged on the downstream side in the rotation direction α of the secondary transfer belt relative to the roller 62 as the first roller. A brush 532 as the abutment member includes a first abutment portion 532a and second abutment portion 532b. The first abutment portion 532a and the second abutment portion 532b are connected through a third abutment portion 532c. That is, in the present embodiment, since the rollers 504, 62 are arranged as described above, the brush 532 has a shape as illustrated in FIG. 15.

In this case, the first abutment portion 532a abuts against the outer peripheral surface of the secondary transfer belt on the inner side in the width direction relative to the restriction roller 62b in a first region where the roller 62 is located. The first abutment portion 532a may be located on the inner side in the width direction relative to the chamfered part 620 in a manner similar to the first embodiment. On the other hand, the second abutment portion 532b abuts against the secondary transfer belt on the outer side in the width direction relative to the axial-direction end of the roller 504 in a second region where the roller 504 is located. The position of the second abutment portion 532b with respect to the axial-direction end of the roller 504 is similar to that of the first embodiment. The third abutment portion 532c abuts against the outer peripheral surface of the secondary transfer belt in a third region which is located between the first region and the second region. Also in the present embodiment, it is possible to prevent capsizing of the secondary transfer device, and also prevent climbing of the restriction rib and a reduction in the belt life in a manner similar to the first embodiment.

Fifth Embodiment

Figure 7A:
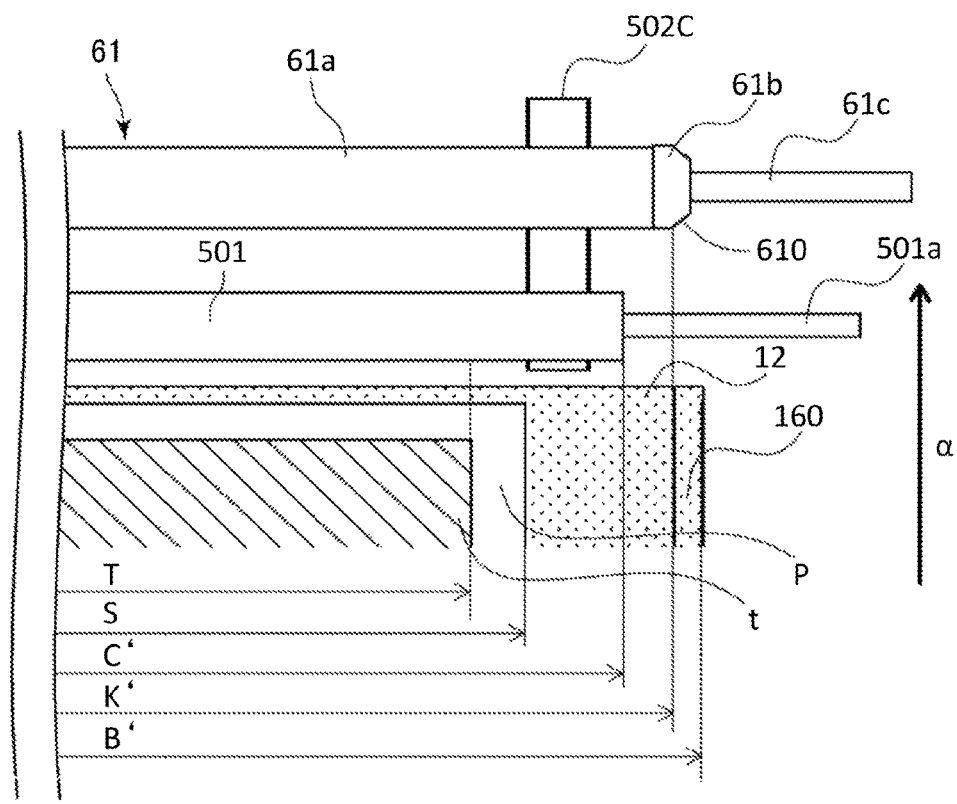
FIG. 7A is a schematic diagram illustrating the arrangement relationship between each roller and a brush in Comparative Example 3.
Figure 7B:
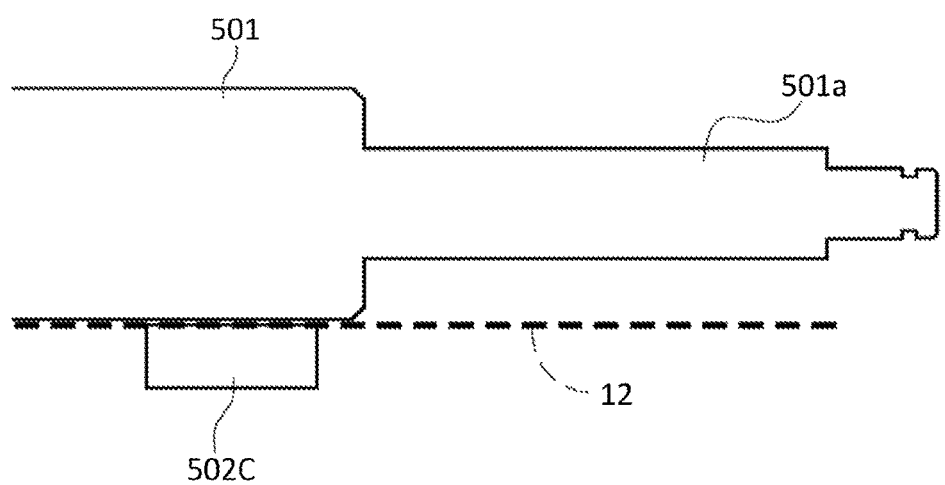
FIG. 7B is a diagram describing the arrangement relationship between an end of a counter roller and the brush in Comparative Example 3.

A fifth embodiment will be described with reference to FIGS. 7A and 7B. In the present embodiment, an abutment region where a brush 502C abuts against a secondary transfer belt 12 is located on the inner side relative to a width-direction end of a counter roller 501. Each part illustrated in FIG. 7A is similar to that of FIG. 4. Also in the present embodiment, a brush 502B is arranged within the range of the arrangeable region 510 of FIG. 4.

In the present embodiment, in order to prevent a reduction in the belt life caused by the over-displacement of the belt in Comparative Example 1 and the stress concentration in Comparative Example 2, the brush 502C abuts against the outer peripheral surface of the secondary transfer belt 12 on the inner side relative to the width-direction end of the counter roller 501. However, in such a configuration, since the brush 502C is arranged on the outer side in the width direction relative to the width T of the toner image t having the maximum size, the length in the width direction of each part is larger than that of the first embodiment. That is, a length C' in the axial direction of the counter roller 501, a distance K' in the width direction within which the restriction roller 61b restricts the deviation of the secondary transfer belt 12, and a width B' of the secondary transfer belt 12 are larger than C, K, and B in FIG. 4, respectively.

Other Embodiments

The number or the arrangement of the first roller and the second roller is not limited to that of each of the above embodiments. The configuration of the present disclosure can be appropriately applied to any configuration including a first roller that restricts the deviation of the belt and a second roller that is shorter than the first roller.

Although, in each of the above embodiments, the configuration of the present disclosure is applied to the secondary transfer device that includes the secondary transfer belt as the belt, the belt may be any belt capable of carrying a toner image such as an intermediate transfer belt.

According to the present disclosure, it is possible to prevent capsizing of the unit, and also prevent climbing of the restriction member and a reduction in the belt life.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-038095, filed Mar. 1, 2017, which is hereby incorporated by reference herein in its entirety.

What is claimed is:

1. An image forming apparatus comprising:
a belt rotatably disposed, and configured to carry toner;
a first roller configured to support the belt;
a second roller configured to support the belt;
a first cleaning member facing the first roller with the belt interposed therebetween, and configured to clean an outer peripheral surface of the belt;
a second cleaning member facing the second roller with the belt interposed therebetween, and configured to clean the outer peripheral surface of the belt;
a cleaning container configured to rotatably support the first cleaning member and the second cleaning member;
projecting members projecting from an inner peripheral surface of the belt on end portions of the belt to restrict a position in a width direction of the belt;
a first abutment portion disposed in the cleaning container and configured to abut against the outer peripheral surface of the belt at one end portion of the belt, the first abutment portion being arranged at a position corresponding to the first cleaning member in a circumferential direction of the belt and arranged on an outer side relative to the first cleaning member in the width direction of the belt; and
a second abutment portion disposed in the cleaning container and configured to abut against the outer peripheral surface of the belt at the one end portion of the belt, the second abutment portion being arranged at a position corresponding to the second cleaning member in the circumferential direction of the belt and arranged on an outer side relative to the second cleaning member in the width direction of the belt,
wherein the second roller is shorter than the first roller in the width direction od the belt, and the projecting member at the one end portion of the belt is configured to abut against an end portion of the first roller when the belt is moved in the width direction,
wherein an outer end of the first abutment portion is located on an inner side relative to the end portions of the first roller, and an inner end of the second abutment portion is located on an outer side of the second roller in the width direction of the belt.

2. The image forming apparatus according to claim 1, wherein a third abutment portion is configured to abut against the outer peripheral surface of the belt and configured to connect the first abutment portion and the second abutment portion each other.

3. The image forming apparatus according to claim 1, wherein the outer end of the first abutment portion is located on an inner side relative to the inner end of the second abutment portion in the width direction of the belt.

4. The image forming apparatus according to claim 1, wherein the second abutment portion is arranged so as to satisfy $\tan^{-1}(d/x)<5°$, where x denotes a gap between the second abutment portion and the second roller in the width direction of the belt, and d denotes an entry amount of the second abutment portion into a virtual cylindrical surface that is formed by extending an outer diameter of the second roller in the axial direction.

5. The image forming apparatus according to claim 1, wherein the second abutment portion is a brush.

6. The image forming apparatus according to claim 1, wherein the first roller includes: a roller portion; and end members disposed on ends of the roller portion and configured to abut against the projecting members when the belt is moved in the width direction, and the outer end of the first abutment portion is located on an inner side in the width direction of the belt relative to the end members.

7. The image forming apparatus according to claim 1, wherein each of the first cleaning member and the second cleaning member is a fur brush.

8. An image forming apparatus comprising:
a belt rotatably disposed, and configured to carry toner;
a first roller configured to support the belt;
a second roller configured to support the belt;
a first cleaning member facing the first roller with the belt interposed therebetween, and configured to clean an outer peripheral surface of the belt;
a second cleaning member facing the second roller with the belt interposed therebetween, and configured to clean the outer peripheral surface of the belt;
a cleaning container configured to rotatably support the first cleaning member and the second cleaning member;
projecting members projecting from an inner peripheral surface of the belt on end portions of the belt to restrict a position in a width direction of the belt;
a first abutment portion disposed in the cleaning container and configured to abut against the outer peripheral surface of the belt at one end portion of the belt, the first abutment portion being arranged at a position corresponding to the first cleaning member in a circumferential direction of the belt and arranged on an outer side relative to the first cleaning member in the width direction of the belt; and
a second abutment portion disposed in the cleaning container and configured to abut against the outer peripheral surface of the belt at the one end portion of the belt, the second abutment portion being arranged at a position corresponding to the second cleaning member in the circumferential direction of the belt and arranged on an outer side relative to the second cleaning member in the width direction of the belt,
wherein the second roller is shorter than the first roller in the width direction of the belt, and the projecting member at the one end portion of the belt is configured to abut against an end portion of the first roller when the belt is moved in the width direction,
wherein an outer end of the first abutment portion is located on an inner side relative to the end portions of the first roller, and an outer end of the second abutment portion is located on the inner side relative to the end of the second roller in the width direction of the belt.

9. An image forming apparatus comprising:
a belt rotatably disposed, and configured to carry toner;
projection portions provided on end portions of the belt, and projecting in a direction from an outer peripheral surface of the belt to an inner peripheral surface of the belt to restrict a position in a width direction of the belt;

a first cleaning member configured to clean an outer peripheral surface of the belt;

a second cleaning member provided at a position different from the first cleaning member in a circumferential direction of the belt and configured to clean the outer peripheral surface of the belt;

a cleaning container configured to rotatably support the first cleaning member and the second cleaning member;

a first roller opposed to the first cleaning member with the belt interposed therebetween;

a second roller opposed to the second cleaning member with the belt interposed therebetween, wherein the second roller is shorter than the first roller in the width direction of the belt;

first abutment portions disposed in the cleaning container and configured to abut against the outer peripheral surface of the belt, the first abutment portions being each arranged at a position corresponding to the first cleaning member in the circumferential direction of the belt and arranged at a position outside relative to the first cleaning member in the width direction of the belt; and second abutment portions disposed in the cleaning container and configured to abut against the outer peripheral surface of the belt, the second abutment portions being each arranged at a position corresponding to the second cleaning member in the circumferential direction of the belt and arranged at a position outside relative to the second cleaning member in the width direction of the belt, wherein an outer end of each of the first abutment portions is located on an inner side relative to end portions of the first roller in the width direction of the belt, and an inner end of each of the second abutment portions is located on an outer side of the second roller in the width direction of the belt.

10. The image forming apparatus according to claim 9, wherein the first roller includes:

a roller portion; and an end members disposed on ends of the roller portion and configured to abut against the projecting member at the one end portion of the belt when the belt is moved in the width direction;

wherein the outer end of each of the first abutment portions is located on an inner side relative to the end members in the width direction of the belt.

11. The image forming apparatus according to claim 9, wherein third abutment portions configured to abut against the outer peripheral surface of the belt at each end portions of the belt and connect the first abutment portions and the second abutment portions each other.

12. The image forming apparatus according to claim 9, wherein each of the outer end of the first abutment portion are located on an inner side relative to each of the inner end of the second abutment portion in the width direction of the belt.

13. The image forming apparatus according to claim 9, wherein the second abutment portions are arranged so as to satisfy $\tan^{-1}(d/x) < 5°$, where x denotes a gap between second abutment portions and the second roller, and d denotes an entry amount of the second abutment portions into a virtual cylindrical surface that is formed by extending an outer diameter of the second roller in the axial direction.

14. The image forming apparatus according to claim 9, wherein the second abutment portions are a brush.

15. The image forming apparatus according to claim 9, wherein each of the first cleaning member and the second cleaning member is a fur brush.

16. An image forming apparatus comprising:

a belt rotatably disposed, and configured to carry toner;

projection portions projecting in a direction from an outer peripheral surface of the belt to an inner peripheral surface of the belt on each end portion of the belt to restrict a position in a width direction of the belt;

a first cleaning member configured to clean an outer peripheral surface of the belt;

a second cleaning member provided at a position different from the first cleaning member in a circumferential direction of the belt and configured to clean the outer peripheral surface of the belt;

a cleaning container configured to rotatably support the first cleaning member and the second cleaning member;

a first roller opposed to the first cleaning member with the belt interposed therebetween;

a second roller opposed to the second cleaning member with the belt interposed therebetween, wherein the second roller is shorter than the first roller in the width direction of the belt;

first abutment portions disposed in the cleaning container and configured to abut against the outer peripheral surface of the belt, the first abutment portions being arranged at a position corresponding to the first cleaning member in a circumferential direction of the belt and arranged at each position outside relative to the first cleaning member in the width direction of the belt; and second abutment portions disposed in the cleaning container and configured to abut against the outer peripheral surface of the belt, the second abutment portion being arranged at a position corresponding to the second cleaning member in the circumferential direction of the belt and arranged at each position outside relative to the second cleaning member in the width direction of the belt, wherein an outer end of each of the first abutment portions is located on an inner side relative to end portions of the first roller in the width direction of the belt, and an inner end of each of the second abutment portions is located on an outer side of the second roller in the width direction of the belt.

17. The image forming apparatus according to claim 16, wherein the first roller includes:

a roller portion; and an end members disposed on ends of the roller portion and configured to abut against the projecting member at the one end portion of the belt when the belt is moved in the width direction;

wherein the outer end of each of the first abutment portions is located on an inner side relative to the end members in the width direction of the belt.

* * * * *